United States Patent [19]
Sakamoto et al.

[11] Patent Number: 5,165,715
[45] Date of Patent: Nov. 24, 1992

[54] SUSPENSION SYSTEM FOR AUTOMOTIVE VEHICLE

[75] Inventors: Kiyoshi Sakamoto; Hideyuki Okada; Hiroshi Ohmura, all of Hiroshima, Japan

[73] Assignee: Mazda Motor Corporation, Hiroshima, Japan

[21] Appl. No.: 674,250

[22] Filed: Mar. 25, 1991

[30] Foreign Application Priority Data

Mar. 23, 1990 [JP] Japan .................. 2-74515
Jun. 20, 1990 [JP] Japan .................. 2-162248
Jun. 28, 1990 [JP] Japan .................. 2-168336

[51] Int. Cl.⁵ .................................... B60G 11/26
[52] U.S. Cl. ................... 280/707; 280/6.12; 364/424.05
[58] Field of Search ............ 280/707, 6.12, DIG. 1, 280/840; 364/424.05

[56] References Cited

U.S. PATENT DOCUMENTS

| | | | |
|---|---|---|---|
| 4,880,073 | 11/1989 | Konno | 280/91 |
| 4,953,890 | 9/1990 | Kamimura | 280/707 |
| 4,973,855 | 11/1990 | Kamimura et al. | 280/707 |
| 5,013,061 | 5/1991 | Fujimura et al. | 280/714 |
| 5,060,970 | 10/1991 | Kamimura et al. | 280/707 |

Primary Examiner—Charles A. Marmor
Assistant Examiner—Paul Dickson
Attorney, Agent, or Firm—Fish & Richardson

[57] ABSTRACT

The posture of the automotive vehicle body is controlled by supplying or discharging the operating fluid to or from the cylinder unit for each wheel, which is interposed between a sprang weight and an unsprung weight. When an incident occurs to such an extent that the control over the posture of the vehicle body cannot be implemented in a normal way, the control is suspended. When such an incident occurs during cornering of the vehicle body, the suspension of the control over the posture of the body is so modified as to implement a special control, preferably control being made so as to lower the vehicle height by forcibly discharging the operating fluid from the cylinder unit. This prevents the vehicle body from being leaned after the end of the cornering. A decision as to cornering is made by taking advantage of the state of operation of the steering wheel or the magnitude of transverse acceleration. Preferably, a decision is made to determine if the difference in inner pressures between the left-hand and right-hand cylinder units is a predetermined value or higher.

31 Claims, 8 Drawing Sheets

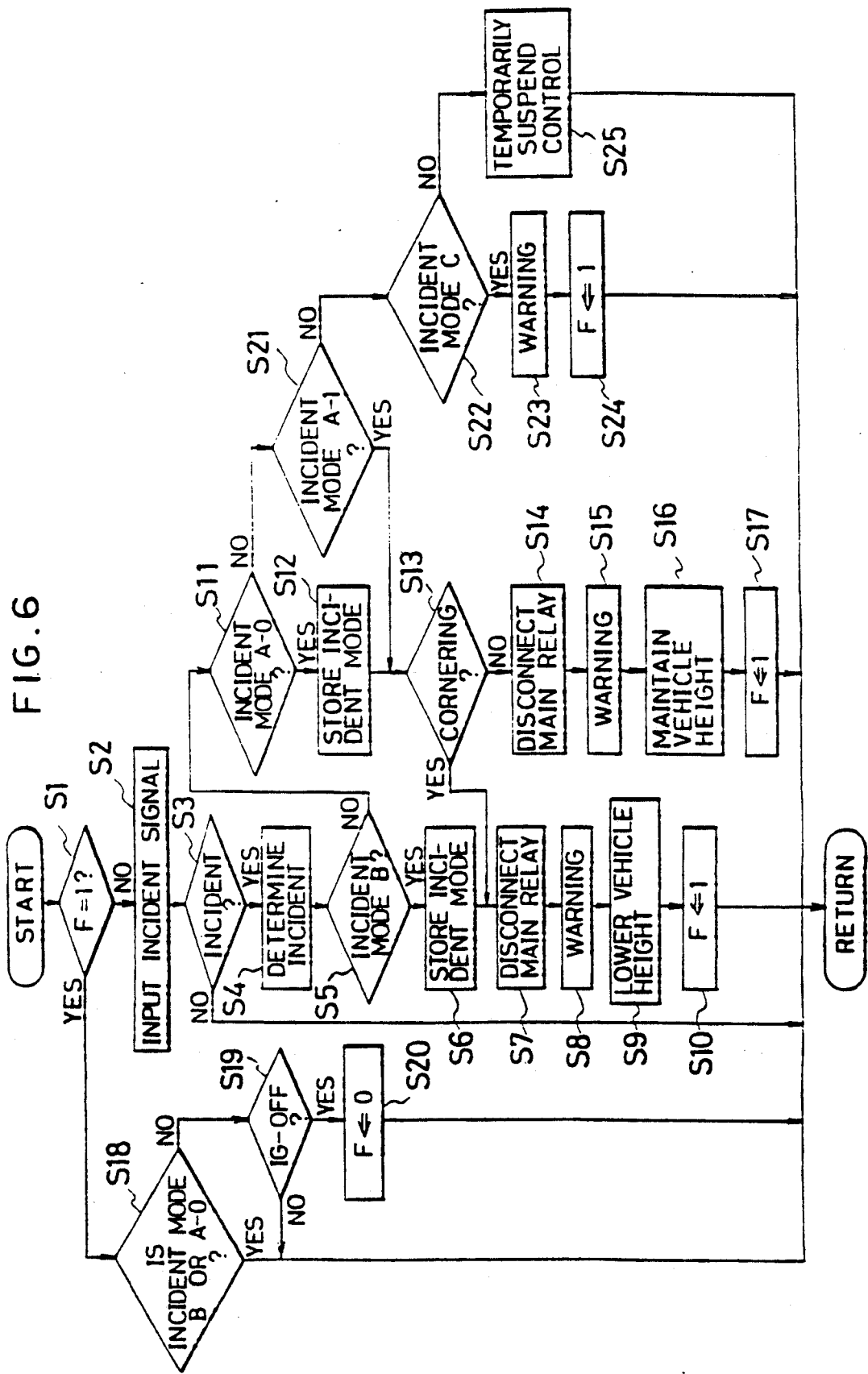

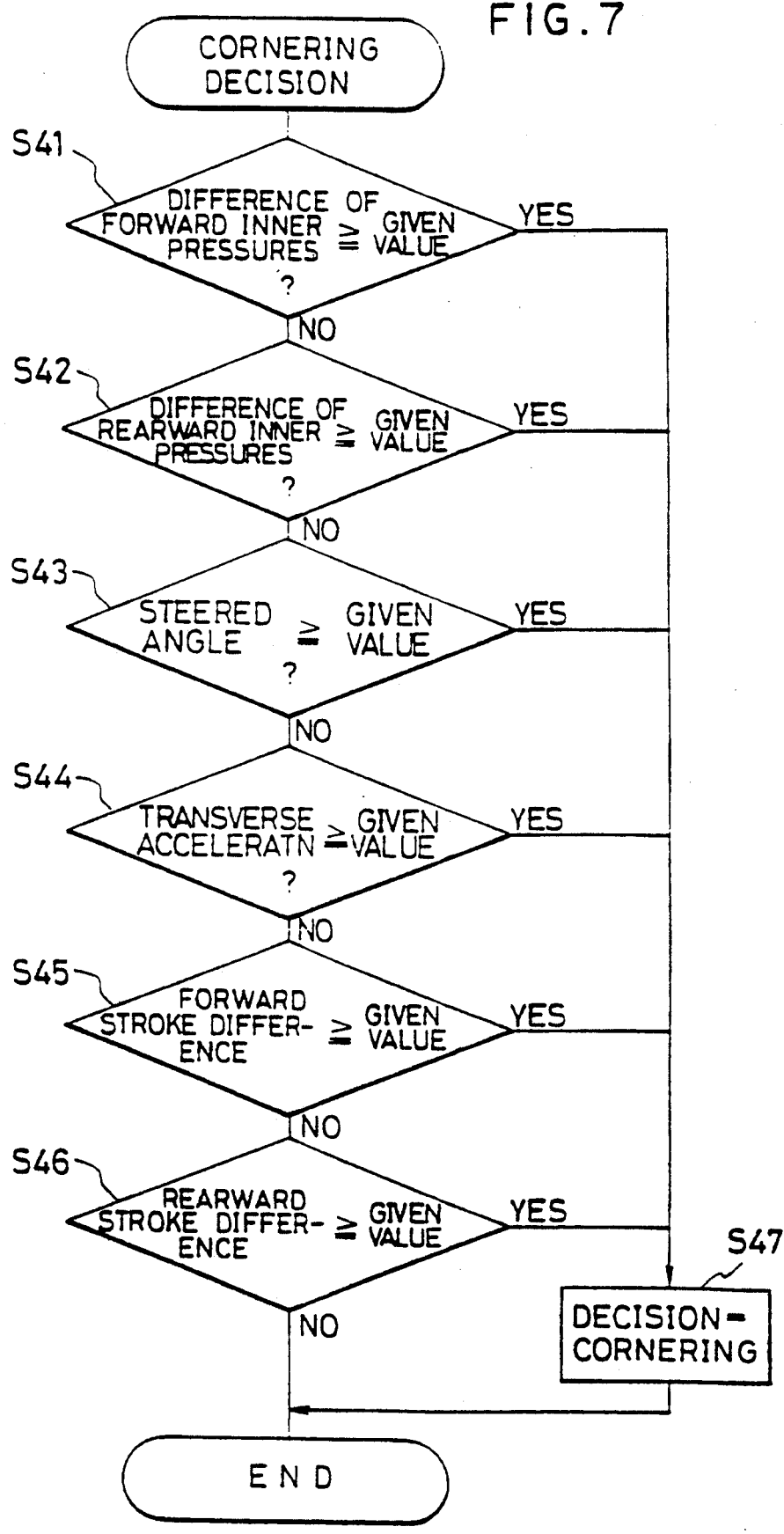

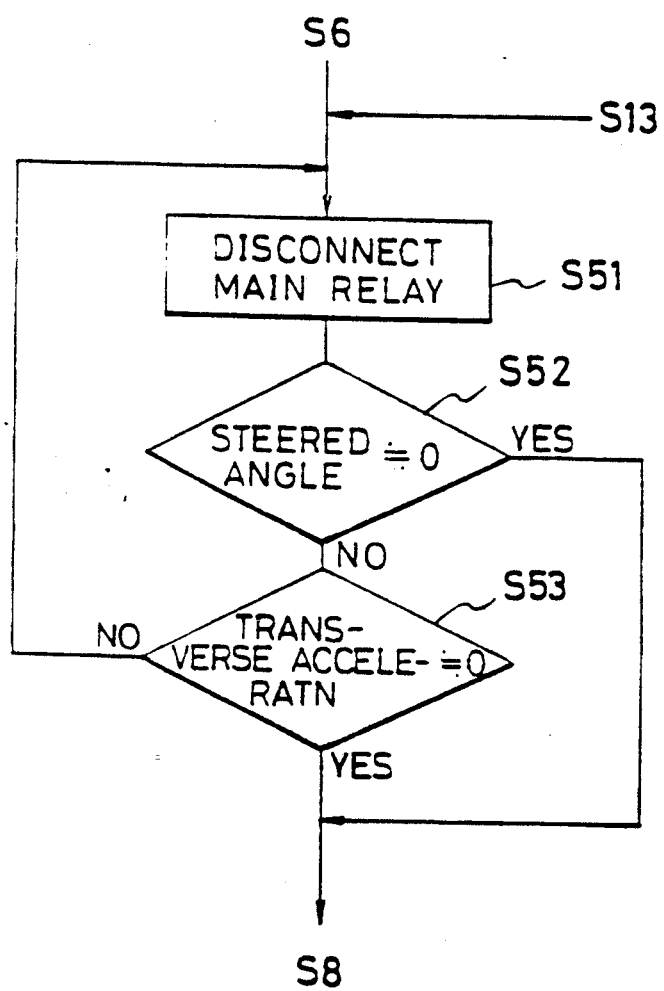

SUSPENSION SYSTEM FOR AUTOMOTIVE VEHICLE

BACKGROUND OF THE INVENTION

1. Field of the Invention

The present invention relates to a suspension system for an automotive vehicle so adapted as to control the posture of an automotive vehicle body by controlling the supply or discharge of a fluid to or from a cylinder and, more particularly, to a suspension system for the automotive vehicle involved particularly with fail safe measures in the event of an incident in a supply-discharge control system.

2. Description of Related Art

A suspension system for the automotive vehicle is known, for example, as disclosed in Japanese Patent Laid-open Publication (kokai) No. 130,418/1988, which has plural cylinders disposed between a spring weight and an unsprung weight for each wheel, to each of which plural gas springs are connected so as to allow the independent and separate supply or discharge of the fluid to each cylinder, thereby performing the control over the posture of the automotive vehicle body. This system is known as an active control suspension system (ACS system).

For such an ACS system, a supply-discharge control valve for supplying or discharging an operating fluid is so arranged as to be controlled by supply or discharge control means under a predetermined condition. It is to be noted, however, that an incident may be caused to occur to such an extent that the supply-discharge control means cannot work in a correct way. Such an incident is considered to include incidents with respect to the supply-discharge control means itself as well as various sensors, fluid circuits for supplying or discharging the fluid, among many others. When those incidents occur, the posture of the automotive vehicle body cannot be controlled in a normal way so that the control by the supply-discharge control means should be suspended.

It is to be noted herein that, when the supply or discharge control means is suspended while the automotive vehicle is cornering, the automotive vehicle body is kept learning (rolling) even if the automotive vehicle body is returned to the straight running state. In other words, while the automotive vehicle body is cornering, transverse acceleration acts upon the automotive vehicle body as centrifugal force, thereby causing the automotive vehicle body to lean in the direction in which the transverse acceleration works and imposing different loads onto the left-hand and right-hand wheels. The ACS system is so designed as to control the different loads disposed upon the left-hand and right-hand wheels by changing inner pressures within the respective cylinders for the left-hand and right-hand wheels. However, a new problem may arise when the control by the supply or discharge control means is suspended, which involves leaning the automotive vehicle body in the opposite direction when the automotive vehicle body is returned to its straight running state from the cornering state by acting the different loads upon the left-hand and right-hand wheels.

SUMMARY OF THE INVENTION

Therefore, the object of the present invention is to provide a suspension system for an automotive vehicle so adapted as to appropriately cope with abnormal implementation of control over the posture of the automotive vehicle body by supplying or discharging the operating fluid to or from the cylinder units, even if an incident would occur during cornering of the automotive vehicle body.

In order to achieve the aforesaid object, the present invention is basically so constructed as to suspend the control over the posture of the automotive vehicle body upon occurrence of an incident and, further, to provide a predetermined correcting condition in suspending the control during cornering.

More specifically, the present invention consists of a suspension system for an automotive vehicle, comprising:

a cylinder unit interposed between a spring weight and an unsprung weight for each wheel;

supply-discharge means for supplying or dischargin an operating fluid to or from the cylinder unit;

a first control means for controlling the supply-discharge means under a predetermined condition;

incident detecting means for detecting occurrence of an incident which impedes normal implementation of control by the supply-discharge control means;

interrupting means for suspending the control by the supply-discharge means when the incident is detected by the incident detecting means; and A second control means for controlling the supply-discharge means in accordance with the incident detected by the incident detecting means when the control by the first control means is suspended by the interrupting means cornering detecting means for detecting cornering of an automotive vehicle body; and correction means for correcting the control by the control means so as to release a function of maintaining the vehicle body height when the cornering detecting means detects that the automotive vehicle body is cornering.

The correcting condition to be provided upon the suspension of the control over the posture of the automotive vehicle body may preferably include a condition for lowering a vehicle height of the automotive vehicle body by forcibly discharging the operating fluid from the cylinder units. The lowering of the vehicle height thereof serves as improving stability of the automotive vehicle body as well as suppressing the automotive vehicle body from leaning. Further, the suspension system according to the present invention can prevent the situation from occurring, which involves leaning largely in the direction opposite to the direction in which the automotive vehicle body is leaned during cornering, when the automotive vehicle body is returned to its straight running state from its cornering state.

A decision to determine if the automotive vehicle body is cornering can be made, for example, by taking advantage of a steered angle of a steering wheel, transverse acceleration, and so on. Furhter, the cornering of the automotive vehicle body can be determined by taking advantage of a difference in inner pressures between the left-hand and right-hand cylinder units.

It is preferred that the vehicle height of the automotive vehicle body be lowered at the time when the automotive vehicle body is returned to its nearly straight running state after the control over the posture of the automotive vehicle body has been suspended.

It is also preferred that an incident mode be used properly in accordance with the kind of incidents. The incident mode may include a first incident mode for suspending the control over the posture of the automotive vehicle body by lowering the vehicle height of the automotive vehicle body and a second incident mode for suspending the control over the posture of the automotive vehicle body while maintaining the current vehicle height of the automotive vehicle body. Even if the kind of the incident would correspond to the second incident mode, it can be modified so as to correspond to the first incident mode by the correction means during occurrence of an incident during cornering of the automotive vehicle body.

It is further preferred that the high pressure line through which the high pressure operating fluid passes is released to the low pressure line, i.e. a reservoir tank. This arrangement for the high pressure line can ensure prevention of the high pressure operating fluid from being supplied erroneously to the cylinder units for some reasons.

Other objects, features and advantages of the present invention will become apparent in the course of the description of the preferred embodiments, which follows, with reference to the accompanying drawings.

BRIEF DESCRIPTION OF THE DRAWINGS

FIG. 6 is a flowchart showing a fail safe control in the controller 19.

FIG. 7 is a flowchart showing an example of decision to determine if the automotive vehicle body is cornering.

FIG. 8 is a flowchart showing a variant according to the present invention.

DESCRIPTION OF THE PREFERRED EMBODIMENTS

The present invention will be described more in detail with reference to the accompanying drawing.

Figure 1:
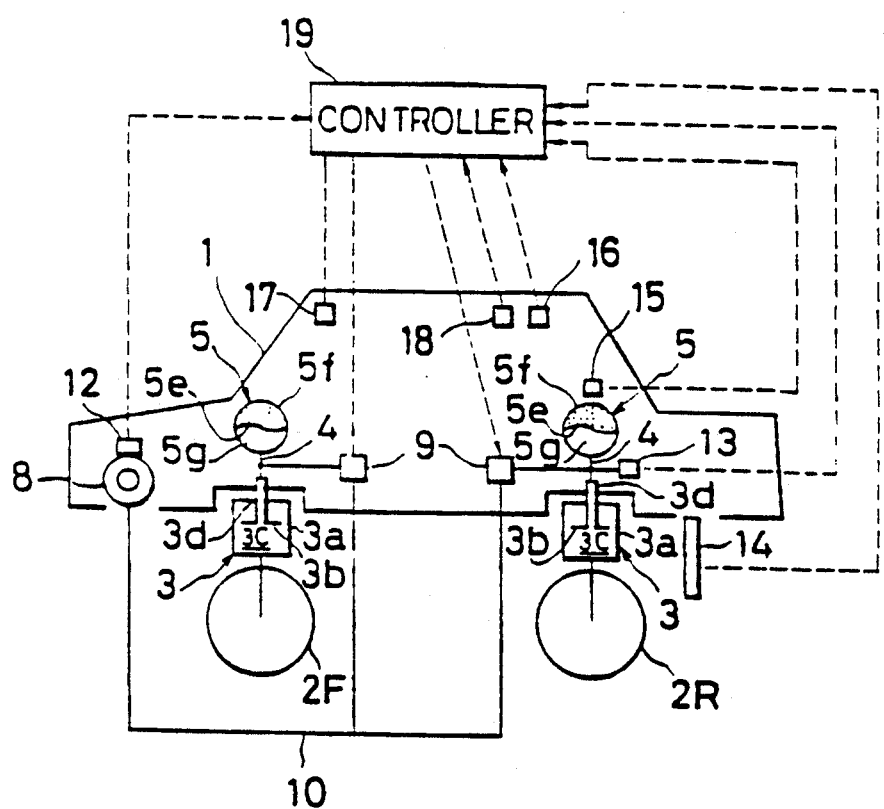
FIG. 1 is a block diagram showing an entire layout of the suspension system for the automotive vehicle according to an embodiment of the present invention.

Referring to FIG. 1, reference numeral 1 stands for an automotive vehicle body, reference numeral 2F for a front wheel, and reference numeral 2R for a rear wheel. Between the vehicle body 1 as spring weight and each of the front wheel 2F and the rear wheel 2R as unsprung weight is interposed a liquid cylinder 3. Each of the liquid cylinders 3 is divided into or defined by a liquid pressure chamber 3c by a piston 3b inserted into a cylinder body 3a. An upper end portion of a connecting rod 3d connected to the piston 3b is connected to the automotive vehicle body 1 and the cylinder body 3a is connected to each of the front wheels 2F and the rear wheels 2R. More specifically, the inside of the cylinder body 3a constitutes substantially one liquid pressure chamber 3c regardless of the disposition of the piston 3b. In other words, the liquid pressure chamber 3c comprises an upper liquid pressure chamber section located above the piston 3b and a lower liquid pressure chamber section located underneath the piston 3b, and both of the two liquid pressure chamber sections are always communicated with each other through a communication hole or a cut-off portion formed on the piston 3b.

To the liquid pressure chamber 3c of each of the liquid cylinders 3 is connected through a communication passage 4, a gas spring 5 which in turn is divided into a gas chamber 5f and a liquid pressure chamber 5g by a diaphragm 5e and the liquid pressure chamber 5g is communicated with the liquid pressure chamber 3c of each of the liquid cylinders 3.

Figure 2:
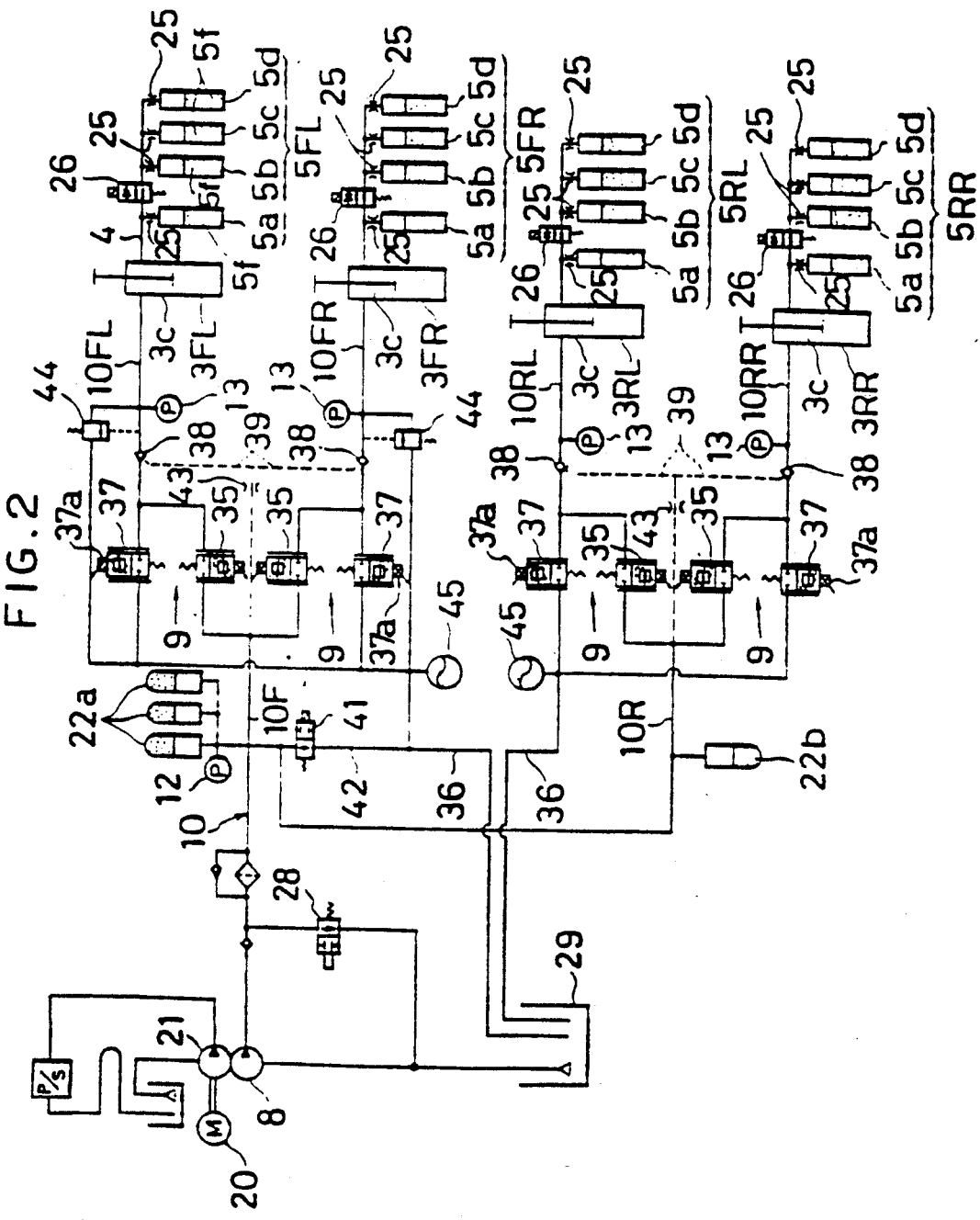
FIG. 2 is a diagrammatic representation of a hydraulic pressure circuit for supplying or discharging the operating fluid in the suspension system for the automotive vehicle according to the embodiment of the present invention.

As shown in FIG. 2, reference numeral 8 denotes a hydraulic pressure pump 8 which is communicated with each of the liquid cylinders 3 through a liquid pressure passage 10 as a high pressure line, and reference numeral 9 denotes a flow rate control valve which is mounted to the liquid pressure passage 10 and which has the function of adjusting an inner pressure, i.e. the liquid pressure within the liquid pressure chamber 3c, by supplying or discharging the liquid, or oil, to or from each of liquid cylinders 3.

As further shown in FIG. 2, reference numeral 12 stands for a main pressure sensor for sensing the pressure for discharging the liquid of the hydraulic pressure pump 8, i.e. the pressure of the liquid accumulated in each of accumulators 22a and 22b, reference numeral 13 for a cylinder pressure sensor for sensing the liquid pressure of the liquid pressure chamber 3c of each of the liquid cylinders 3, reference numeral 14 for a vehicle height sensor for sensing a vehicle height, i.e. a cylinder stroke of slide, for each of the front wheels 2F and the rear wheels 2R, reference numeral 15 for a vertical acceleration sensor for sensing vertical acceleration of the automotive vehicle, or spring acceleration of the front and rear wheels 2F and 2R, as will be described hereinafter in more detail. In FIG. 1, reference numeral 16 is used for a vehicle speed sensor for sensing a vehicle speed of the automotive vehicle, i.e. spring acceleration of the front wheels 2F and the rear wheels 2R, reference numeral 17 for an ignition switch, and reference numeral 18 for a parking switch. The signals sensed by these sensors and the shift signals outputted from these switches are inputted into a controller 19 composed of a microcomputer having a CPU, etc., and they are employed for controlling changes of suspension characteristics.

FIG. 2 shows a hydraulic pressure circuit for controlling the supply or discharge of the liquid to or from the the liquid cylinders 3. As shown in FIG. 2, the hydraulic pressure pump 8 comprises a swash plate type piston pump of a variable volume type and it is connected in two rows to a hydraulic pressure pump 21 for power steering unit drivable by a driving source 20. With the liquid pressure passage 10 connected to the hydraulic pressure pump 8 are communicated three accumulators 22a, 22a and 22a at identical sites at which the liquid pressure passage 10 is in turn branched into a front wheel liquid pressure passage 10F and a rear wheel liquid pressure 10R. The front wheel liquid pressure passage 10F is further branched into a left-hand front wheel liquid pressure passage 10FL and a right-hand front wheel liquid pressure 10FR. The front wheel liquid pressure passage 10FL is communicated with the liquid pressure chamber 3c of a left-hand liquid cylinder 3FL of the respective wheel while the right-hand front wheel liquid pressure passage 10FR is communicated with the liquid pressure chamber 3c of a right-hand liquid cylinder 3FR of the respective wheel. On the other hand, the rear wheel liquid pressure passage 10R is communicated with one accumulator 22b and it is divided into a left-hand rear wheel liquid pressure 10RL and a right-hand rear wheel liquid pressure 10RR on the downstream side of the accumulator 22b. The left-hand rear wheel liquid pressure passage 10RL is communicated with the liquid pressure chamber 3c of the left-hand rear liquid cylinder 3RL of the respective wheel while the right-hand rear wheel liquid pressure passage 10RR is communicated with the liquid pressure chamber 3c of the right-hand rear liquid cylinder 3RR thereof.

Each of the liquid cylinders 3FL, 3FR, 3RL and 3RR is connected to a plurality of gas springs 5FL, 5FR, 5RL and 5RR, respectively. For each of the gas springs 5FL, 5FR, 5RR and 5RL, in this embodiment, there are provided four of the gas springs, i.e. first gas spring 5a, second gas spring 5b, third gas spring 5c, and fourth gas spring 5d, for example, which are disposed in parallel to each other and communicated with the liquid pressure chamber 3c of the respective liquid cylinder 3 through the communication passage 4. Each of the gas springs 5a, 5b, 5c, and 5d is provided with an orifice 25 at its branch portion of the communication passage 4, and the orifice 25 is so disposed as to exhibit both its damping action and buffer action in association with gas filled in the gas chamber 5f. The communication passage 4 is provided in a position between the first gas spring 5a and the second gas spring 5b with a damping-force shifting valve 26 for adjusting a passage area of the communication passage 4 and the damping-force shifting valve 26 is so arranged as to assume two positions, an open position in which the communication passage 4 is opened and a closed position in which the passage area of the communication passage 4 is restricted to a remarkable extent.

To the liquid pressure passage 10 is connected an unload valve 27 on the upstream side of the accumulator 22a, which functions as controlling the oil discharge pressure of the hydraulic pressure pump 8 so as to retain within a predetermined range, i.e. 120 to 160 kgf/cm². The unload valve 27 is so arranged as to assume a supply position and a discharge position. More specifically, when the unload valve 27 assumes its supply position, on the one hand, the amount of the liquid to be discharged from the hydraulic pressure pump 8 by introducing the pressure liquid to be discharged from the hydraulic pressure pump 8 into a swash-plate operating cylinder 8a of the hydraulic pressure pump 8. When the unload valve 27 assumes its closed position, on the other hand, the pressure liquid within the cylinder 8a is discharged and the unload valve 27 is further so arranged as to shift its position from the discharge position to the supply position when the pressure at which the liquid is discharged from the hydraulic pressure pump 8 exceeds a predetermined upper limit discharge liquid pressure, i.e. 160±10 kgf/cm², and then as to maintain its state until the liquid pressure reaches a predetermined lower limit discharge liquid pressure, e.g. 120±10 kgf/cm², or lower. In other words, the unload valve 27 exhibits the function of controlling the discharge liquid pressure of the hydraulic pressure pump 8 within a predetermined range from 120 kgf/cm² to 160 kgf/cm². The flow rate control valve 28 is so arranged as to assume both of a supply position in which the pressure oil is introduced from the hydraulic pressure pump 8 to the swash-plate operating cylinder 8a through the unload valve 27, and a discharge position in which the pressure oil within the cylinder 8a is discharged from the unload valve 27 to a reserve tank 29. This flow rate control valve 28 functions as controlling the amount of the liquid discharged from the hydraulic pressure pump 8 to a constant level by constantly retaining the differential pressure between the upstream side and the downstream side at the portion where a restrictor 30 for the liquid pressure passage 10 is disposed, when the liquid discharge pressure of the hydraulic pressure pump 8 is retained within the predetermined range by the unload valve 27. Hence, the liquid is supplied as a main pressure to each of the liquid cylinders 3 by accumulating the liquid for the accumulators 22a and 22b.

Four of the flow rate control valves 9 are disposed on the downstream side of the accumulator 22a of the liquid pressure passage 10 so as to correspond to the four wheels, respectively. It is noted herein that, since the construction of the portion corresponding to each of the wheels is identical to each other, only the left-hand front wheels are described while description of the other will be omitted. The flow rate control valve 9 comprises a supply control valve 35 disposed on the left-hand liquid pressure passage 10FL of the liquid pressure passage 10, and a discharge control valve 37 disposed on a low pressure line 36 for discharging the liquid or oil from the left-hand liquid pressure passage 10FL to the reserve tank 29. Each of the supply control valves 35 and the discharge control valves 37 is so arranged as to assume two positions, i.e. an open position and a closed position, and has a differential pressure valve built therein in order to retain the liquid pressure at its open position at a predetermined value.

On the left-hand front wheel liquid pressure passage 10FL extending between the supply control valve 35 and the left-hand front liquid cylinder 3FL, there is disposed a check valve 38 (inner pressure retaining means) of a type operative in response to pilot pressure, as means for retaining pressure. The check valve 38 is so disposed as to be closed when the pilot pressure reaches 40 kgf/cm² or lower by introducing the oil pressure, i.e. main pressure, as a pilot pressure, within the liquid pressure passage 10 on the upstream side of the supply control valve 35 of the flow rate control valve 9 through a pilot line 39. In other words, only when the main pressure is higher than 40 kgf/cm², can the pressure oil be supplied to the liquid cylinder 3 as well as the liquid or oil within the liquid cylinder 3 be discharged.

As shown in FIG. 2, reference numeral 41 denotes a fail safe valve so disposed on the communication passage 42 communicating the liquid pressure passage 10 on the downstream side of the accumulator 22a with the low pressure line 36 as to function as releasing a high pressure state by returning the oil accumulated in the accumulators 22a and 22b to the reserve tank 29 by shifting to its open position at the time of an incident. Reference numeral 43 denotes a restrictor (inner pressure retaining means) so disposed on the pilot line 39 as to have the function of delaying the closing of the check valve 38 at the time when the fail safe valve 41 is operated to open. Further, reference numeral 44 denotes a relief valve capable of returning the liquid or oil to the low pressure line 36 by operating to open when the oil pressure of the liquid pressure chamber 3c of each of the left-hand front liquid cylinder 3FL and the right-hand front liquid cylinder 3FR is raised to an abnormally high level. Reference numeral 45 denotes a return accumulator so connected to the low pressure line 36 as to perform the action of accumulating the liquid or oil when the liquid or oil is discharged from the liquid chamber 3.

The controller 19 may be comprised of a microcomputer and arranged to perform the following control over the supply or discharge of the fluid to or from each of the fluid cylinders 3, which basically includes:

control over the vehicle height to assume a target vehicle height on the basis of a signal sensed by the vehicle height sensor for each of the wheels;

control to reduce vertical vibration of the automotive vehicle body on the basis of a signal sensed by the vertical acceleration sensor 15;

control to equalize a support load between the left-hand and right-hand wheels on each of the front wheel side and right wheel side on the basis of a signal sensed by the cylinder pressure sensor 13 for each of the wheels; and control to enhance response to each of the fluid cylinders 3 on the basis of each of signals sensed by the transverse acceleration sensor, the steered angle sensor and the wheel speed sensor.

Figure 3:
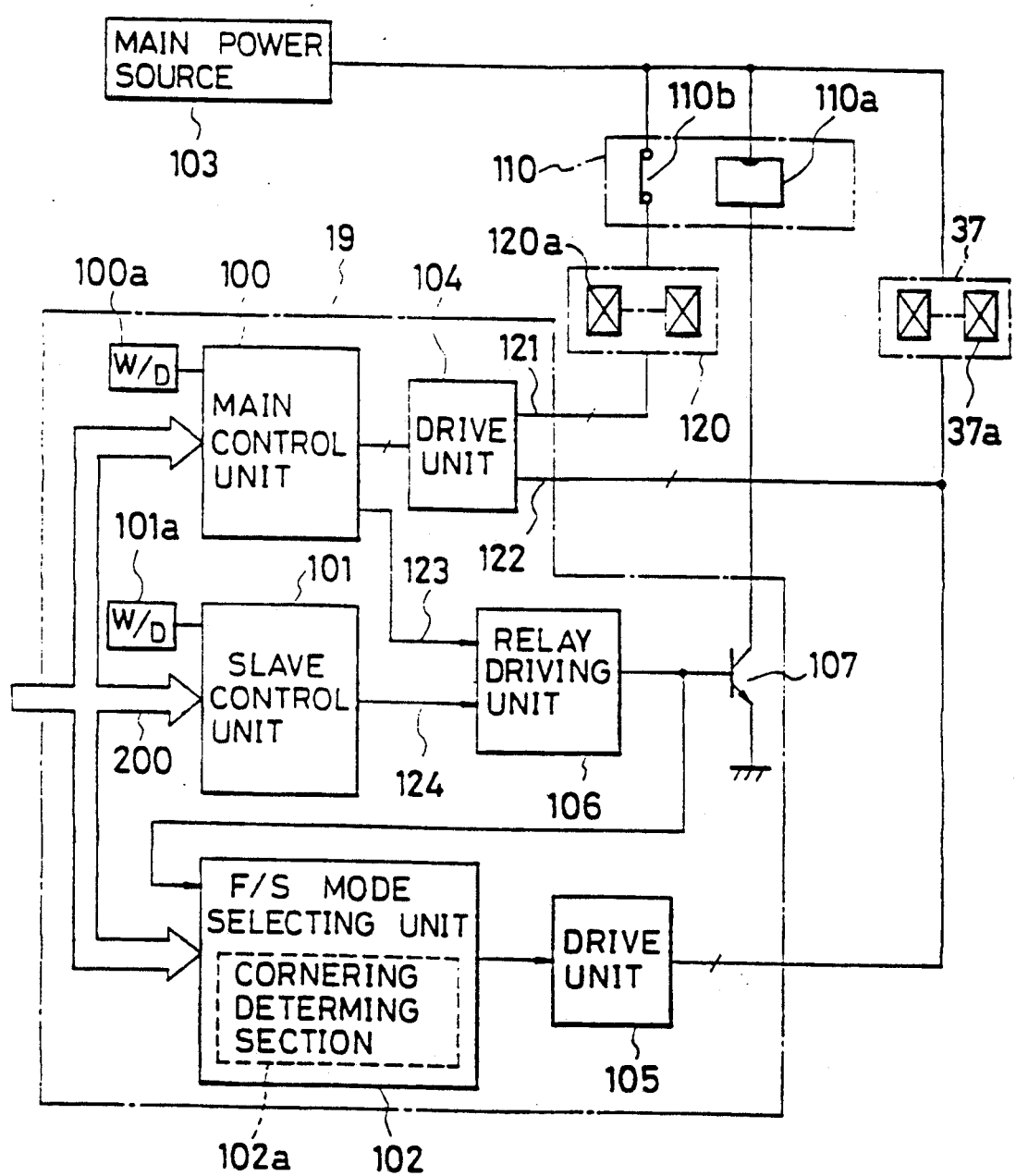
FIG. 3 is a block diagram showing the construction of the controller 19 and its peripheral units or sections.

FIG. 3 is a block diagram showing the construction of the controller 19 and peripheral units or sections to be controlled.

As shown in FIG. 3, the controller 19 receives signals from each of the various sensors through a signal line 200 and it comprises a main control unit 100 for controlling a supply/discharge control valve 120 (referred to in generic terms for the valves 28, 35 and 41) for supplying or discharging the fluid to or from the fluid cylinders and a discharge valve 37 through a drive unit 104, a slave control unit 101 for monitoring abnormality of the main control unit 100, while exchanging information with the main control unit 100, and a F/S mode selecting unit 102 for selecting a fail safe mode on the basis of the results of decision by the main control unit 100 or the slave control unit 101 or the like. The controller 19 further comprises a relay driving unit 106 for driving a transistor 107 in response to a control signal from the main control unit 100 or the slave control unit 101.

A cornering determining section 102a of the F/S mode selecting unit 102 receives signals from the steered angle sensor 17, the transverse acceleration sensor 16, the cylinder pressure sensor 13, and the vehicle height sensor 14 and decides to determine the cornering of the automotive vehicle body, in a manner as will be described hereinafter, by comparing each of the signals sensed by these sensors with a predetermined value. The drive unit 105 is to drive the discharge valve 37 in response to the control by the F/S mode selecting unit 102.

A contact 110b of the main relay is so arranged as to be closed when its wound section 110a is excited by the control by the transistor 107, thereby supplying power source from the main power source 103—in this embodiment, a battery—to a solenoid 120a of the supply/-discharge control valve 120. The solenoid 120a of the supply/discharge control valve 120 is controlled by the main control unit 100 through the drive unit 104 and then operated in accordance with this control. At the same time, a solenoid 37a of the discharge valve 37 is also controlled by the main control unit 100 through the drive unit 104. When the transistor 107 brings the wound section 110a of the main relay 110 into a state in which the wound section 110 is not excited, however, the contact 110b is allowed to be brought into an open state so that power source to the solenoid 120a is disconnected and the solenoid 120a is then released from the control by the drive unit 104. At this time, the supply of power source to the solenoid 37a of the discharge valve 37 is continued.

It is to be noted herein that the main control unit 100 and the slave control unit 101 have watch dog (W/D) circuits 100a and 101a, respectively, and that the control by each of the control units is suspended at the time when a runaway of each control unit is detected.

Figure 4:
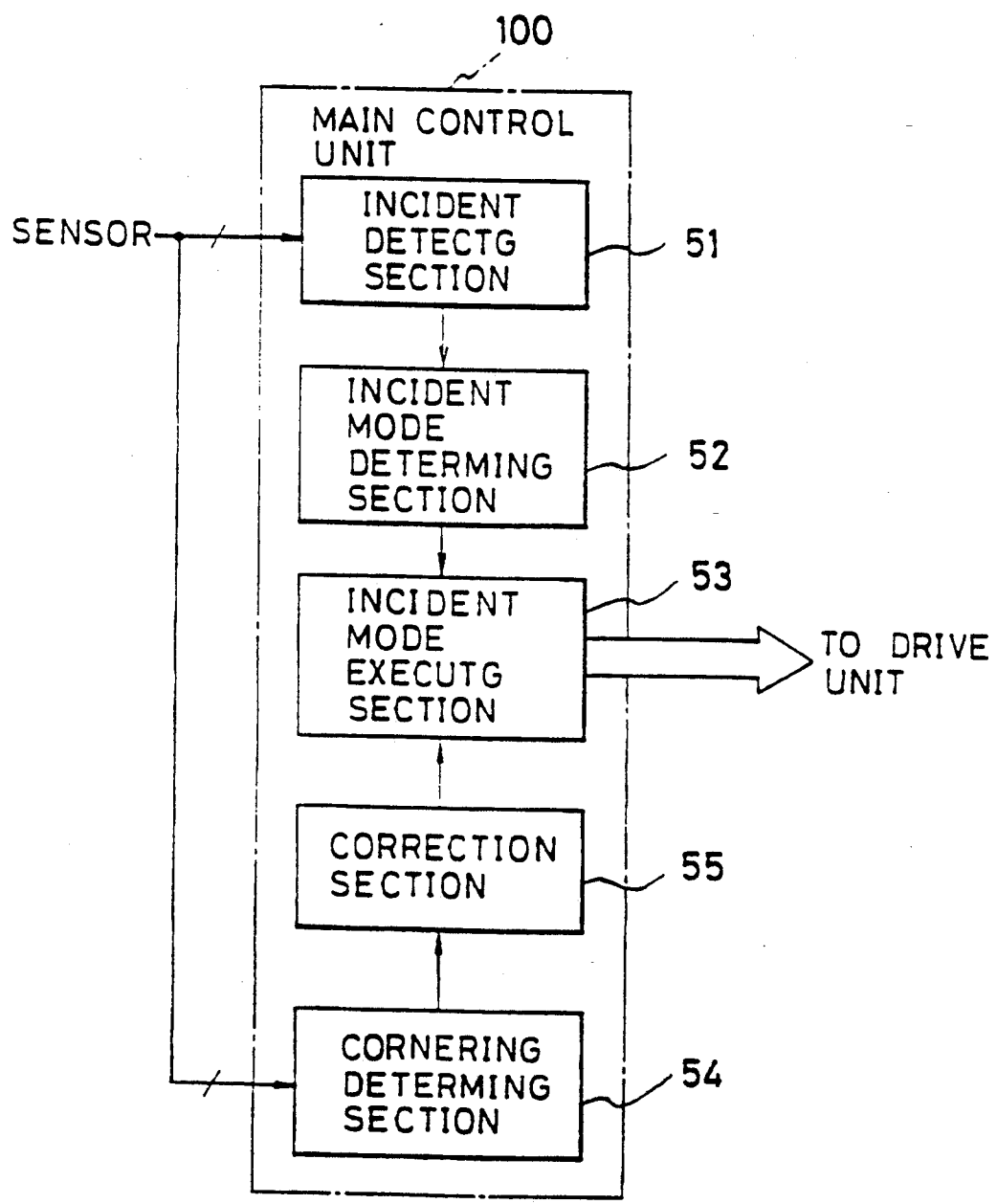
FIG. 4 is a block diagram showing the construction of the main control unit 100.

FIG. 4 is a block diagram showing the construction of the main control unit 100. As shown in FIG. 4, the main control unit 100 comprises an incident detecting section 51 for detecting an incident of a supply/discharge control system in response to the signal sensed by each of the sensors, an incident mode determining section 52 for determining an incident mode on the basis of the signal from the incident detecting section 51, and an incident mode executing section 53 for controlling the drive unit 104 of the supply/discharge control valve 120 in accordance with the result of decision as to the incident mode. Further, the main control unit 100 is provided with a cornering determining section 54 for determining the cornering of the automotive vehicle body, by comparing the signals sensed by the particular sensors with a predetermined value, and a correction section 55 for forcing the incident mode executing section 53 to execute a predetermined incident mode when it is decided in response to the signal from the cornering determining section 54 that the automotive vehicle body is cornering.

Figure 5:
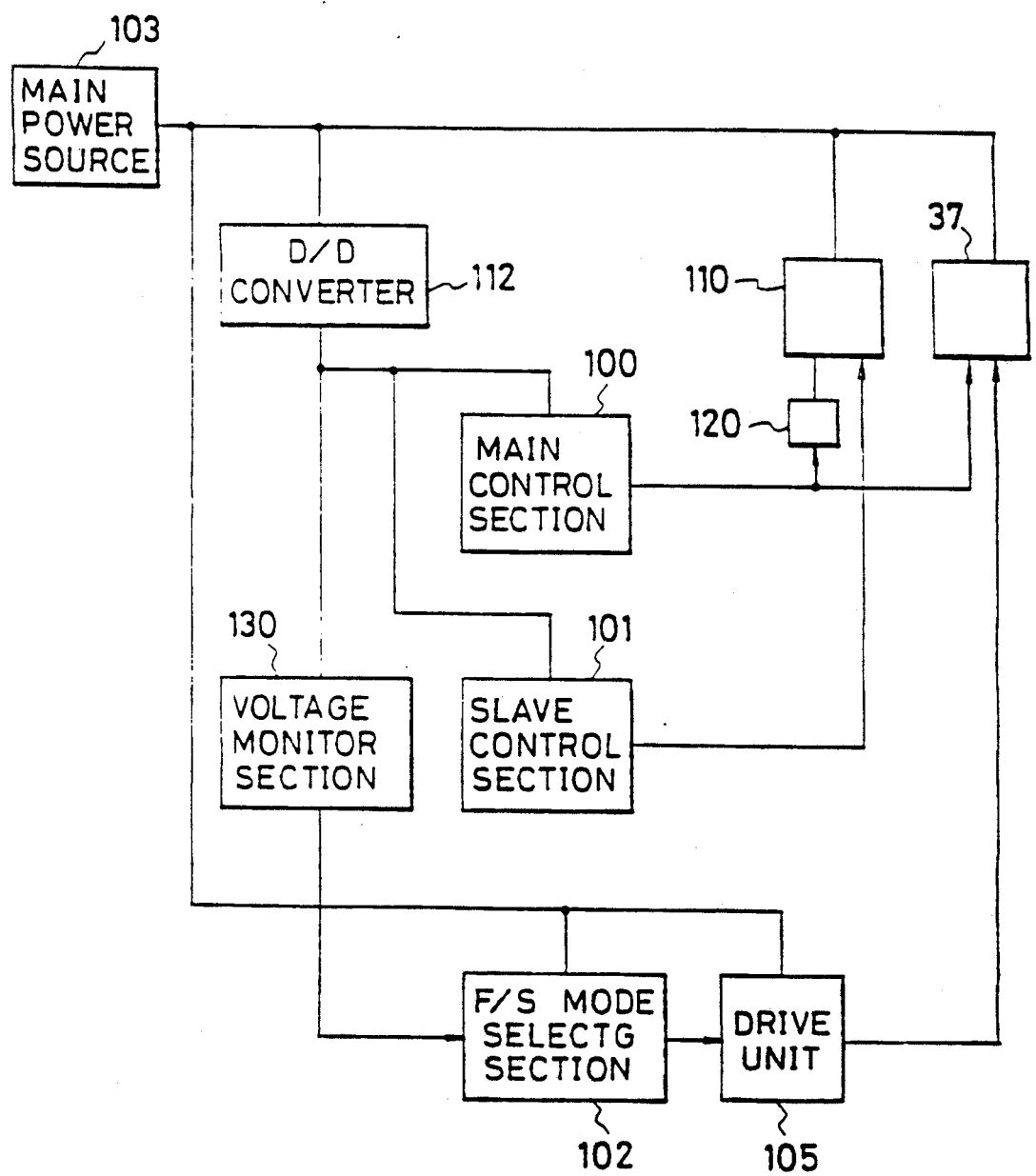
FIG. 5 is a diagrammatic representation of a system for supplying the power source to the controller 19 and its peripheral units or sections.

FIG. 5 is a brief block diagram showing a system for supplying the power source to the controller 19 and its peripheral units and sections. As shown in FIG. 5, a D/D converter 112 is to convert the power source from the main power source 103 into a predetermined direct current power source and to supply the direct current power source to the main control unit 100 and the slave control unit 101.

On the other hand, as is apparent from FIG. 3, the direct current power source is supplied from the main power source 103 composed of the battery to the main relay 110 and the discharge valve 37. As shown in FIG. 5, both of the F/S mode selecting unit 102 and the drive unit 105 are provided with the direct current power source from the main power source 103.

The power source monitoring section 130 is always monitoring output voltage from the D/D converter 112 and transmits a signal for giving notification of abnormality of electric voltage to the F/S mode selecting unit 102.

Description of Fail Safe Control

Detailed description will be made of the fail safe control involved in this embodiment.

The fail safe control may include:

a. fail safe control to be performed on the basis of a signal from each of the sensors, indicative of an incident, when the main control unit functions in a normal manner;

b. fail safe control to be performed when the main control unit functions in an abnormal manner; and c. fail safe control to be performed when the power source causes abnormality.

The incident modes involved in this embodiment may include:

(1) incident mode A (corresponding to a second incident mode recited in the claim portion of this specification): an incident which requires the control to be suspended while maintaining the current vehicle height of the automotive vehicle body; the incident mode A further including:

(1.1) incident mode A-0: the incident mode is to be maintained until the incident is dealt with; and (1.2) incident mode A-1: the incident mode is reset when ignition is off (IG-OFF).

(2) incident mode B (corresponding to a first incident mode recited in the claim portion thereof): an incident which requires the vehicle height of the automotive vehicle body to be lowered by discharging the fluid (oil) within the fluid cylinders.

(3) incident mode C: an incident which requires the control to be continued by merely giving a warning such as an on-and-off light of an alarm lamp or the like.

It is to be noted that the contents of an incident corresponding to each of the incident modes will be described hereinafter.

Description will now be made of the fail safe control to be performed by the controller 19 on the basis of the signal from each sensor, indicative of an incident, when the main control unit 100 is functioning in a normal way, with reference to the flowchart as shown in FIG. 6. Referring to FIG. 6, at step S1, a decision is made to determine if an incident flag F of the main control unit 100 is set to one. When the result of decision at step S1 is in the negative, i.e. it indicates that the incident flag F is not set to one, on the one hand, then the program flow goes to step S2 at which the incident detecting section 51 of the main control unit 100 inputs the signal sensed by each sensor as a signal for detecting an incident. Then, at step S3, a decision is made to determine on the basis of the incident signals if an incident arises. When it is decided at step S3 that no incident arises, the processing is finished as it is. On the other hand, when it is decided at step S3 that the incident arises, then the program flow goes to step S4 at which the incident mode is determined or distinguished by the incident mode determining section 52.

Then, at step S5, a decision is further made to determine if the incident mode involved is incident mode B. If the result of decision at step S5 is in the affirmative, i.e. it indicates that the incident mode is incident mode B, the incident mode B is executed at steps which follow. In other words, the mcs stores the incident mode at step S6, followed by proceeding to step S7 at which the incident mode executing section 53 of the main control unit 100 generates a control signal through a control line 123 to the relay driving unit 106 so as to bring the contact 110b of the main relay 110 into its open state. On the other hand, the slave control unit 101 constantly exchanges information with the main control unit 100 through a signal line 200 to monitor abnormality of operation of the main control unit 100. When it is decided that the main control unit 100 is functioning in a normal way, the relay driving unit 106 is provided through a control line 124, likewise the main control unit 100, with a control signal, i.e. a control signal allowing the contact 110b of the main relay 110 to be opened.

The relay driving unit 106 is so arranged as to control the transistor 107 in response to the control signals from the main control unit 100 and the slave control unit 101. In other words, after it has received the control signals, the relay driving unit 106 stops the excitation of the wound section 110a of the main relay 110 by regulating the transistor 107. As a result, the contact 110b of the main relay 110 is caused to be in its open state, so that the electricity to the solenoid 120a of the supply/discharge control valve 120 is disconnected, thereby causing the supply/discharge control valve 120 to be brought into its closed position and at the same time the fail safe valve 41 to be brought into its open position. In other words, each of the valves 120 and 41 is of electromagnetic type, the valve 120 being of a type which is constantly closed yet opened when it is excited and the valve 41 being of a type which is constantly open yet closed when it is excited.

Then, at step S8, a warning is given by turning the alarm lamp on and off or the like, followed by proceeding to step S9 at which a drive signal is transmitted to the solenoid 37a of the discharge 37 through the drive unit 104, thereby controlling the fluid (oil) so as to be discharged at a maximum flow rate from a liquid chamber 3c of the fluid cylinder for each of the wheels to lower the vehicle height of the automotive vehicle body. The discharge of the fluid (oil) from the liquid chamber 3c of the fluid cylinder by the discharge valve 37 is performed while a predetermined time is delayed until the check valve 38 is closed by the restrictor 43 after the fail safe valve 41 has assumed its open position. It is to be noted herein that the discharge valve 37 is of a type which is constantly closed yet opened when it is excited.

The main control unit 100 finishes the processing by setting the flag F to one at step S10 after execution of the incident mode B.

On the other hand, the program flow proceeds to step S11 when it is decided at step S5 that the incident mode is not incident mode B. At step S11, a decision is made to determine if the incident mode is incident mode A-0. When the result of decision at step S11 indicates that the incident mode involved is incident mode A-0, the incident mode involved is stored at step S12, followed by proceeding to step S13 at which the cornering determining section 54 decides if the automotive vehicle body is cornering on the basis of the signal sensed by the particular sensors. When the result of decision at step S13 indicates that the automotive vehicle body is cornering, the correction section 55 inhibits the incident mode executing section 53 from executing the incident mode A in response to a signal from the cornering determining section 54, followed by proceeding to step S7 at which the incident mode B is forcibly executed. In other words, like at the time of execution of the incident mode B, the contact 110b of the main relay 110 is brought into an open state so as to disconnect the excitation of the solenoid 120a of the supply/discharge control valve 120, thereby allowing the supply/discharge control valve 120 to assume its closed position and the fail safe valve 41 to assume its open position.

When it is decided at step S13 that the automotive vehicle body is not cornering, on the other hand, then the incident mode A will be executed in a manner as will be described hereinafter.

First, at step S14, the relay driving unit 106 receives a control signal for opening the contact 110b of the main relay 110 generated by the main control unit 100 and the slave control unit 101, thereby controlling the transistor 107 in accordance with the control signal and disconnecting the excitation of the wound section 110a of the main relay 110. As a result, the excitation of the solenoid 120a of the supply/discharge control valve 120 is disconnected, like at the time of execution of the incident mode B, thereby bringing the supply/discharge control valve 120 into its closed position and the fail safe valve 41 into its open position. Then, the program flow goes to step S15 at which a warning is given.

The cornering determining section 102a of the F/S mode selecting unit 102 is to determine whether or not the automotive vehicle body is cornering in response to signals generated from the particular sensors through the signal line 200 and as a result of comparison of the signals with a predetermined value. The F/S mode selecting unit 102 learns that the incident mode involved is the incident mode A on the basis of the decision result and the signal from the relay driving unit 106. Then, at step S16, the F/S mode selecting unit 102 controls the drive unit 105 to generate no control signal to the discharge valve 37 in order to allow the discharge valve 37 to keep its closed position, thereby maintaining the vehicle height of the automotive vehicle body.

After execution of the incident mode A in the manner as described hereinabove, the program flow goes to step S17 at which the flag F is set to one followed by the end of the processing.

When the resul of decision at step S11 indicates that the incident mode involved is not the incident mode A-O, then the program flow goes to step S21 at which a decision is made to determine if the incident mode involved is incident mode A-1. When the result of decision at step S21 is in the affirmative, then the program flow goes to step S13 at which a decision is further made to determine if the automotive vehicle body is cornering, followed by proceeding with execution of the incident mode A-O in the manner as described hereinabove. On the contrary, when the result of decision at step S21 is in the negative, i.e. when it is not decided that the incident mode currently involved is the incident mode A-1, then the program flow goes to step S22 at which a decision is further made to determine whether or not the incident mode currently involved is incident mode C.

If it is decided at step S22 that the incident mode currently involved is the incident mode C, then the program flow goes to step S23 at which a warning is given, for example, by turning a light on and off, followed by proceeding to step S24 at which the flag F is set to one and then by the end of the processing. On the other hand, when the result of decision at step S22 indicates that the incident mode currently involved is not the incident mode C, i.e. that neither of the incident mode A nor the incident mode B nor the incident mode C are involved, then the program flow goes to step S25 at which the processing is temporarily finished.

Referring back to the first step for the processing of the fail safe control, when the result of decision at step S1 is in the affirmative, then the program flow goes to step S18 at which a decision is made to determine if the incident mode currently involved is incident mode B or incident mode A-O. When the result of decision at step S18 is in the negative, on the one hand, the program flow goes to step S19 at which a decision is further made to determine if an ignition switch is turned off to suspend the engine. When the result of decision at step S19 indicates that the ignition switch is turned off, then the program flow goes to step S20 at which the flag F is set to zero, followed by the end of the processing. If the result of decision at step S19 indicates that the ignition switch is turned on, i.e. that the engine is working, then the processing is finished as it is.

The following is a description of the fail safe control to be performed by the main control unit 100 when the main control unit is operating in an abnormal way, for example, due to runaway or for other reasons.

The operation of the main control unit 100 is constantly monitored by the watch dog circuit 100a attached thereto and by the slave control unit 101, while the operation of the slave control unit 101 itself is monitored by the watch dog circuit 101a attached thereto.

When the main control unit 100 would cause abnormality in operation of its control due to a runaway or for other reasons, the watch dog circuit 100a senses its abnormality, thereby suspending the operation of the main control unit 100. Further, upon exchanges of information with the main control unit 100, the slave control unit 101 detects the abnormality of the main control unit 100, thereby transmitting a signal for notifying the relay driving unit 106 of the abnormality through a control line 124.

The relay driving unit 106 determines the abnormality in the operation of the main control unit 100 from the signal notifying of such abnormality and shuts out the main relay 110, in the same manner as the incident mode is executed on the basis of the incident signals when the main control unit is working in a normal way, as described hereinabove. At the same time, the F/S mode selecting unit 102 transmits a signal to the drive unit 105 for controlling the discharge valve 37 on the basis of the signal from the relay driving unit 106 and the result of comparison between the signal sensed by the particular sensors and the predetermined value. In other words, the cornering determining section 102a of the F/S mode selecting unit 102 controls the discharge valve 37 to discharge the fluid or oil from the liquid pressure chamber 3c of each fluid cylinder and lowers the vehicle height of the automotive vehicle body when it is decided from the result of comparison between the signals generated by the particular sensors and the predetermined value that the automotive vehicle body is cornering. When it is decided that the automotive vehicle body is not cornering, on the other hand, control is performed so as to keep the discharge valve 37 in its closed position in order to maintain the current vehicle height of the automotive vehicle body.

Further, description will be made of the fail safe control when the power source causes abnormality.

When the supply of the power source to the main control unit 100 or the slave control unit 101 is disconnected or no predetermined magnitude of the voltage is to be secured due to occurrence of an incident in the D/D converter 112 as shown in FIG. 5, these control units are brought out of control. Hence, no operation of the drive unit 104 and the relay driving unit 106 is also guaranteed, thereby shutting out the transistor 107 due to a lack of base voltage. This further disconnects the supply of the power source to the wound section 110a of the main relay 110, leading to the state in which the contact 110b thereof is opened.

The voltage monitoring section 130 constantly monitors the output voltage of the D/D converter 112 and transmits to the F/S mode selecting unit 102 a signal notifying of abnormality in voltage immediately after it has sensed such abnormality. Then, the F/S mode selecting unit 102 transmits a signal for driving the discharge valve 37 to the drive unit 105 on the basis of the signal notifying of the abnormality of voltage and the result of comparison between the signals sensed by the particular sensors and the predetermined value. In other words, when it is decided that the automotive vehicle body is cornering as a result of comparison between the signals from the particular sensors and the predetermined value, the discharge valve 37 is controlled to reduce the vehicle height of the automotive vehicle body, as in the same manner as in the case where the fail safe control is performed when the main control unit 100 caused abnormality in its operation. In the opposite case, the discharge valve 37 is controlled to maintain the current vehicle height of the automotive vehicle body.

FIG. 7 shows an example for a decision to determine if the automotive vehicle body is cornering, which corresponds to the contents of control to be performed by the cornering determining section 54 in FIG. 4. This control corresponds to step S13 of FIG. 6.

Referring to FIG. 7, when either one of decisions at steps S41 to S46, inclusive, gives the result in the affirmative, it is then determined at step S47 that the automotive vehicle body is currently cornering. If all the decisions at steps S41 to S46, inclusive, come to the conclusion that the automotive vehicle body is not cornering currently, then the processing is ended as it is. The following is description of a sequence of the contents of decisions at steps S41 to S46.

Firstly, the decision is to be made on the basis of the signals from the pressure sensors 13 for sensing the inner pressures within the cylinder units 5, and this decision corresponds to steps S41 and S42. When it is decided at steps S41 that the difference between the left-hand and right-hand cylinder units 5 and 5 on the front wheel side is equal to or larger than a predetermined value, then it is determined that the automotive vehicle body is cornering. Likewise, when it is decided at step S42 that the difference between the left-hand and right-hand cylinder units 5 and 5 on the rear wheel side is equal to or larger than a predetermined value, then it is determined that the automotive vehicle body is cornering.

Secondly, a decision is to be made at step S43 on the basis of the signals from the steered angle sensor 17 for sensing the steered angle of the steering wheel. It is determined that the automotive vehicle body is cornering when the steered angle thereof is decided to be equal to or larger than a predetermined value at step S47.

Thirdly, a decision is made at step S44 to determine if the transverse acceleration acting upon the automotive vehicle body is equal to or greater than a predetermined value on the basis of the transverse acceleration sensor 16. When it is decided at step S44 that the transverse acceleration is equal to or greater than the predetermined value, then the program flow goes to step S47 at which it is determined that the automotive vehicle body is cornering.

Fourthly, a decision is made on the basis of the signals generated from the vehicle height sensors 14 for detecting the vehicle height of the automotive vehicle body at each wheel position. The vehicle height sensed by the vehicle height sensor 14 is the same as a stroke amount of the cylinder unit 5. In other words, a decision is made at step S45 to determine if the difference between the vehicle heights (the stroke amounts) at the left-hand and right hand wheel positions on the front wheel side is equal to or greater than a predetermined value. When the result of decision at step S45 indicates that the difference of the stroke amounts is equal to or greater than the predetermined value, the programs flow goes to step S47 at which it is decided that the automotive vehicle body is cornering. Likewise, it is decided at step S46 whether or not the difference between the vehicle heights (stroke amounts) at the left-hand and right-hand wheel positions on the rear wheel side is equal to or greater than a predetermined value and, when the result of decision at step S46 indicates that the difference is equal to or greater than the predetermined value, then it is determined at step S47 that the automotive vehicle body is cornering.

As described hereinabove, the present invention can determine the cornering of the automotive vehicle body with extreme ease, while competing with an incident of the sensors, by determining on the basis of the plural sensors, or plural conditions, if the automotive vehicle body is cornering, and consequently by making a final decision as to the cornering of the automotive vehicle body on the basis of either of the results of the decision.

FIG. 8 shows another embodiment according to the present invention. FIG. 8 is a variant of FIG. 6, in which a portion of the system of FIG. 6 is modified. The common elements are omitted from FIG. 8. In this embodiment, when the vehicle height of the automotive vehicle body is to be lowered, the operation of opening the discharge valve 37 is delayed until it is confirmed that the automotive vehicle body is brought into such a state of running in a nearly straight line after the main relay 110 has been disconnected at step S51. The decision comes to the conclusion athat the automotive vehicle body is running in a nearly straight line when either of the conditions at step S52 or at step S53 is satisfied. In other words, a decision is made at step S52 to determine if the steered angle is approximately zero or a decision is made at step S53 to determine if the transverse acceleration is approximately zero.

Description will then be made of the relationship between specific incidents of instrument in the supply-discharge control system for controlling the supply or discharge of the fluid and the incident modes to be determined by the incident mode determining section 52. The incident mode involved may be determined as either of incident modes A-0, A-1, B or C, for example, under the following conditions.

1. The incident mode involved is determined as incident mode C if the vehicle height of the automotive vehicle body would be higher by 30 mm or higher than a reference vehicle height when the ignition switch is turned on. In this case, the fail safe valve 41 is shifted to its closed position. The incident at this time is considered to be caused by dirt filled in the check valve 38 of the liquid passage 10, so that the flow of a pressure fluid or oil through the liquid pressure passage 10 can solve this incident, thereby performing the flow rate control smoothly.

2. The incident mode involved is determined as incident mode A-0 when the main pressure is equal to or lower than a reference pressure (30 kgf/cm$^2$) after several seconds (for example, 5 seconds) have elapsed from the time when the ignition switch had been turned on. The incident at this time is considered to be caused by the fail safe valve 41 being fixed to its open position, a tear in a pipe for the liquid pressure passage 10, an incident in the main pressure sensor 12, or the like, and these incidents are serious ones that cannot be recovered unless repaired.

3. The incident mode involved is determined as incident mode A-0 when the output signal of the main pressure sensor 12 is equal to or greater than an upper limit service voltage (4.5 V). In this case, a cause of the incident is considered based on shortage in Vcc of the main pressure sensor 12.

4. The incident mode involved is determined as incident mode A-1 when the output signal of the main pressure sensor 12 is equal to or lower than a lower limit service voltage (0.5 V). The incident is considered to be caused by shortage in GND of the main pressure sensor 12. Unlike the shortage in Vcc as described in item 3 above, the shortage in the GND in this case may be recovered.

5. When the main pressure is equal to or greater than 185 kgf/cm$^2$, the incident mode involved is determined as incident mode A-0. The cause of an incident may be based on an incident of the unload valve 28 or the like. It can be noted herein that the control by the controller 19 is temporarily suspended when the main pressure is reduced down to 100 kgf/cm$^2$ or lower, while the control is resumed when the main pressure reached 110 kgf/cm$^2$.

6. The incident mode involved is determined as incident mode A-0 when the main pressure does not arise for a predetermined time period (for example, approximately 5 seconds) regardless of the control by the controller 19 being suspended due to the main pressure being reduced down to 100 kgf/cm$^2$ or lower. The cause of an incident may be based on incidents on the side of the unload valve 28, the main pressure sensor 12 and so on.

7. The incident mode involved is determined as incident mode A-0 when the state of the main pressure P satisfying the following condition:

$$|P(t)-P(t-\Delta t)| \leq 2 \text{ kgf/cm}^2$$

(where $\Delta t = 1$ second) lasts for 10 minutes or longer. This incident is considered to be caused by the signal of the main pressure sensor 12 being fixed.

8. The incident mode involved is determined as incident mode A-1 when the state of the main pressure P satisfying the following condition:

$$|P(t)-P(t-\Delta t)| \leq 2 \text{ kgf/cm}^2$$

(where $\Delta t = 1$ second) lasts continuously for 5 seconds after the relationship between the vertical acceleration G(t) of the automotive vehicle body and gravity acceleration G has satisfied the following:

$$G(t)-1G < -0.1G.$$

In this case, incident is considered to be caused by the signal of the main pressure sensor 12 being fixed, like the item 7 above. However, the duration of the incident is as short as 5 seconds, so that this incident may be recovered.

9. The incident mode involved is determined as incident mode A-1 if the state of the main pressure P satisfying the following condition:

$$|P(t)-P(t-\Delta t)| \leq 2 \text{ kgf/cm}^2$$

(where $\Delta t = 1$ second) lasts continuously for 5 seconds as the automotive vehicle body pressure sensor along the road to such an extent as satisfying the relationship between the current vehicle height H(t) and a reference vehicle height $H_o$: H(t)$-H_o<$30 mm. The cause of an incident in this case is considered to be based on the fixing of the signal from the cylinder pressure sensor 13. This incident may be recovered in the same manner as the item 8 above.

10. When the main pressure is reduced down to 90 kgf/cm$^2$ or lower, the incident mode involved is determined as incident mode A-1. An incident is considered to be caused due to a tear of a pipe or the like.

11. The incident mode involved is determined as incident mode A-0 when the disconnection of the sensors 12 to 18 and an actuator such as the hydraulic pressure pump 8 or the like is detected.

12. When the output signal from an oil level sensor (not shown) for sensing the quantity of oil within the reserve tank 29 is turned off for 1 second, the incident mode involved is determined as incident mode A-0. The cause of an incident is considered to be a tear of a pipe or the like.

13. The incident mode involved is determined as incident mode A-0 when the output signal from the cylinder pressure sensor 13 is equal to an upper limit service voltage (4.5 V) or higher. An incident is considered to be caused by shortage in Vcc of the cylinder pressure sensor 13.

14. The incident mode involved is determined as incident mode A-0 when the output signal from the cylinder pressure sensor 13 is equal to or lower than a lower limit service voltage (0.5 V). An incident is considered to be caused by shortage in GND of the cylinder pressure sensor 13.

15. The control is temporarily suspended in order to prevent the back flow of the oil when the cylinder pressure plus 10 kgf/cm$^2$ becomes greater than the main pressure.

16. The incident mode involved is determined as incident mode B when the wheel of the automotive vehicle further bumps (H(t)$-$H(t$-\Delta$t)$>$0) in a state in which the wheel is bumping (H(t)$-H_o>$0) and the state in which the cylinder pressure has arisen (P(t)$-$P(t$-\Delta$t))$>$0) lasts continuously for 300 ms (0.3 seconds) or longer. An incident is considered to be caused by the fixing of the inflow into the flow rate control valve 9. In this case, as no control can be accomplished so as to have the predetermined vehicle heights identical to each other at all the four wheel positions, the vehicle heights are so arranged as to become identically high at all the four wheel positions in such a state as the fluid cylinders 5 are contracted to a maximized extent by discharging the fluid or oil within the fluid cylinders for the respective wheels.

17. The incident mode involved is determined as incident mode B when the wheel of the automotive vehicle further rebounds (H(t)$-$H(t$-\Delta$t)$>$0) in a state in which the wheel is rebounding (H(t)$-H_o>$0) and the state in which the cylinder pressure has ben lowered (P(t)$-$P(t$-\Delta$t))$>$0) lasts continuously for 300 ms (0.3 seconds) or longer. An incident is considered to be caused by the fixing of the discharge from the flow rate control valve 9. In this case, no control can be performed so as to have the predetermined vehicle heights identical to each other at all at the four wheel positions, in the same manner as in the item 16 above, so that the vehicle height of the automotive vehicle body should be lowered.

18. When the wheel bumps at the rate of 30 mm or greater and the state in which the cylinder pressure is 30 kgf/cm$^2$ or lower has continuously lasted for 300 ms (0.3 second) or longer, the incident mode involved is determined as incident mode B. The cause of an incident is the fixing of the inflow into the flow rate valve 9, as in the item 16 above.

19. When the wheel rebounds at the rate of 60 mm or greater and the state in which the cylinder pressure is 100 kgf/cm² or larger has continuously lasted for 300 ms (0.3 second) or longer, the incident mode involved is determined as incident mode B. The cause of an incident is the fixing of the discharge from the flow rate valve 9, as in the item 17 above.

20. The incident mode involved is determined as incident mode A-0 when the output signal from the vehicle height sensor 14 is equal to or greater than an upper limit service voltage (4.5 V). An incident is considered to be caused by shortage in Vcc of the vehicle height sensor 14.

21. The incident mode involved is determined as incident mode A-0 when the output signal from the vehicle height sensor 14 is equal to or lower than a lower limit service voltage (0.5 V). An incident is considered to be caused by shortage in GND of the vehicle height sensor 14.

22. When the output of the vehicle height sensor 14 does not change for 3 seconds after the vertical acceleration of a certain wheel has reached a predetermined value (0.1 G) or higher, the incident mode involved is determined as incident mode A-1. The cause of an incident is the fixing of the signal of the vehicle height sensor 14 and this incident may be recovered.

23. The incident mode involved is determined as incident mode A-0 when the state in which the output signal from the vertical acceleration sensor 15 is equal to or higher than an upper limit service voltage (4.5 V) has continuously lasted for one second or longer. An incident is considered to be caused by shortage in Vcc of the vertical acceleration sensor 15.

24. The incident mode involved is determined as incident mode A-0 when the state in which the output signal from the vertical acceleration sensor 15 is equal to or lower than a lower limit service voltage (0.5 V) has continuously lasted for one second or longer. An incident is considered to be caused by shortage in GND of the vertical acceleration sensor 15.

25. The incident mode involved is determined as incident mode A-1 when the state has continuously lasted for 500 ms, in which the output from one vertical acceleration sensor 15 did not vary from the output generated 100 ms ago although the other two or three vertical acceleration sensors 15 changed from the outputs generated 100 ms ago. The cause of an incident is considered to be the fixing of the signal from the vertical acceleration sensor 15 and this incident may be recovered.

26. When the output from the vehicle height sensor 14 does not come close to the reference value at all for 10 minutes, the incident mode involved is determined as incident mode A-1. An incident may be considered to be caused by the fixing of the signal from the vehicle height sensor 14, the fixing of the flow rate control valve 9 to its closed position, or the like. This incident, however, may be recovered in the same manner as in the instance where the signal from the vehicle height sensor 14 is fixed.

27. The incident mode involved is determined as incident mode A-0 when the state in which the output signal from the transverse acceleration sensor 16 is equal to or greater than an upper limit service voltage (4.5 V) has continuously lasted for one second or longer. An incident is considered to be caused by shortage in Vcc of the transverse acceleration sensor 16.

28. The incident mode involved is determined as incident mode A-0 when the state in which the output signal from the transverse acceleration sensor 16 is equal to or lower than a lower limit service voltage (0.5 V) has continuously lasted for one second or longer. An incident is considered to be caused by shortage in GND of the transverse acceleration sensor 16.

29. The incident mode involved is determined as incident mode A-O when the output signal from the steered angle sensor 17 is equal to or greater than an upper limit service voltage (4.5 V). An incident is considered to be caused by shortage in Vcc of the steered angle sensor 17.

30. The incident mode involved is determined as incident mode A-O when the output signal from the steered angle sensor 17 is equal to or lower than a lower limit service voltage (0.5 V). An incident is considered to be caused by shortage in GND of the steered angle sensor 17.

31. The incident mode involved is determined as incident mode C when each of vehicle speeds is operated from the output from each of the two vehicle speed sensors 18 and the difference between the operated vehicle speeds is equal to or greater than a predetermined value. The vehicle speed is employed in a control system for enhancing a response of each fluid cylinder 3 during cornering in performing control by the controller 19 over the flow rate of each of the fluid cylinders 3. However, the vehicle speed is merely a secondary element in the control system, too, so that it is not required to suspend the control over the flow rate even if the wrong vehicle speed would have been detected.

32. An error in the central processing unit (CPU) is incident mode A-O.

The aforesaid description is directed to the preferred embodiments of the present invention. It is to be noted, however, that a decision to be made to determine if the automotive vehicle body is cornering may appropriately be performed, in addition to those as described hereinabove, for example, by using a sensor, taking advantage of the difference in vertical acceleration between the left-hand and right-hand side of the automotive vehicle body (by using a pair of left-hand and right-hand vertical acceleration sensors) or by taking advantage of the difference in wheel speed between the left-hand and right-hand wheels (by using a pair of left-hand and right-hand rotational sensors).

The present invention may be embodied in other specific forms without departing from the spirit and scope thereof. The present embodiments as described hereinabove are therefore to be considered in all respects as illustrative and not restrictive, the scope of the invention being indicated by the appended claims, and all the changes, modifications and variations which come within the meaning and range of equivalency of the claims are therefore intended to be encompassed within the spirit and scope of the invention.

What is claimed is:

1. A suspension system for an automotive vehicle, comprising:
   a cylinder unit interposed between a sprung weight and an unsprung weight for each wheel;
   supply-discharge means for supplying or discharging an operating fluid to or from the cylinder unit;

a first control means for controlling at least a vehicle body height by controlling the supply-discharge means under a predetermined condition;

incident detecting means for detecting occurrence of an incident which impedes normal implementation of control by the first control means;

interrupting means for suspending the control by the first control means when the incident is detected by the incident detecting means;

a second control means for controlling the supply-discharge means in accordance with the incident detected by the incident detecting means when the control by the first control means is suspended by the interrupting means;

cornering detecting means for detecting cornering of an automotive vehicle body; and correction means for correcting the control by the second control means so as to release a function of maintaining the vehicle body height when the cornering detecting means detects that the automotive vehicle body is cornering.

2. A suspension system as claimed in claim 1, wherein the control by the second control means to be corrected by the correction means is set so as to lower a vehicle height of the automotive vehicle body by forcibly discharging the operating fluid from the cylinder unit.

3. A suspension system as claimed in claim 1, wherein the cornering of the automotive vehicle body is detected by a steered angle of a steering wheel.

4. A suspension system as claimed in claim 1, wherein the cornering of the automotive vehicle body is detected by a difference in inner pressure between a left-hand cylinder unit and a right-hand cylinder unit.

5. A suspension system as claimed in claim 1, wherein the cornering of the automotive vehicle body is detected by a magnitude of transverse acceleration acting upon the automotive vehicle body.

6. A suspension system as claimed in claim 1, wherein the cornering of the automotive vehicle body is detected by a difference in stroke amount between a left-hand cylinder unit and a right-hand cylinder unit.

7. A suspension system as claimed in claim 1, wherein:

plural cornering detecting means are provided; and the automotive vehicle body is determined as cornering when either one of the plural cornering detecting means detects the cornering of the automotive vehicle body.

8. A suspension system as claimed in claim 1, wherein correction by the correction means is executed when a steered angle of a steering wheel is nearly zero.

9. A suspension system as claimed in claim 8, wherein the correction by the correction means is executed at the time when the steered angle thereof reaches approximately zero after the control by the first control means has been suspended by the interrupting means.

10. A suspension system as claimed in claim 1, wherein the correction by the correction means is executed when a transverse acceleration acting upon the automotive vehicle body is approximately zero.

11. A suspension system as claimed in claim 10, wherein the correction by the correction means is executed at the time when the transverse acceleration reaches approximately zero after the control by the first control means has been suspended by the interrupting means.

12. A suspension system as claimed in claim 2, wherein:

the supply-discharge means comprises a supply control valve and a discharge control valve, which are controllable separately and independently from each other; and the discharge of the operating fluid for lowering the vehicle height thereof is performed by closing the supply control valve and opening the discharge control valve.

13. A suspension system as claimed in claim 12, wherein the discharge control valve assumes its maximum opening angle when the vehicle height thereof is lowered.

14. A suspension system as claimed in claim 2, further comprising inner pressure retaining means for regulating an inner pressure within each cylinder unit so as to reach a value equal to or greater than a predetermined value when the vehicle height thereof is lowered.

15. A suspension system as claimed in claim 2, wherein the automotive vehicle body is determined as cornering when a difference in inner pressure between a left-hand cylinder unit and a right-hand cylinder unit is equal to or greater than a predetermined value.

16. A suspension system as claimed in claim 15, wherein the automotive vehicle body is determined as cornering when at least one of two conditions is met, the two conditions comprising:

a first condition being a difference in inner pressure between the left-hand cylinder unit and the right-hand cylinder unit on the front side of the automotive vehicle body; and a second condition being a difference in inner pressure between the left-hand cylinder unit and the right-hand cylinder unit on the rear side thereof.

17. A suspension system as claimed in claim 2, wherein the correction of the control by the second control means is executed at the time when the steered angle thereof reaches approximately zero after the control by the first control means has been suspended by the interrupting means.

18. A suspension system as claimed in claim 2, wherein the correction of the control by the second control means is executed at the time when the transverse acceleration acting upon the automotive vehicle body reaches approximately zero after the control by the first control means has been suspended by the interrupting means.

19. A suspension system for an automotive vehicle, comprising:

a cylinder unit interposed between a sprung weight and an unsprung weight for each wheel;

a supply control valve for supplying an operating fluid to the cylinder unit;

a discharge control valve for discharging the operating fluid from the cylinder unit;

supply-discharge control means for controlling at least a vehicle body height by controlling the supply control valve and the discharge control valve under a predetermined condition;

incident detecting means for detecting occurrence of an incident which impedes normal implementation of control by the supply-discharge control means;

decision means for deciding if the incident is in a first incident mode or in a second incident mode in response to output from the incident detecting means, the first incident mode being to suspend control by the supply-discharge control means in a state in which a vehicle height of an automotive vehicle body is lowered by discharging the operating fluid within the cylinder unit, and the second incident mode being to suspend the control by the supply-discharge control means by maintaining a current vehicle height thereof;

execution means for executing the incident mode decided by the decision means;

differential pressure detecting means for detecting a difference in inner pressure between a left-hand cylinder unit and a right-hand cylinder unit; and correction means for forcing the execution means to execute the first incident mode based on a decision by the decision means, when the difference in inner pressure is equal to or greater than a predetermined value detected by the differential pressure detecting means.

20. A suspension system as claimed in claim 19, wherein the first incident mode is executed by closing the supply control valve and opening the discharge control valve.

21. A suspension system as claimed in claim 19, wherein the second incident mode is executed by closing both of the supply control valve and the discharge control valve.

22. A suspension system as claimed in claim 19, wherein:

each of the supply control valve and the discharge control valve is of electromagnetic type;

the supply control valve is of such a type as being constantly closed yet opened when excited; and supply of a power source to the supply control valve is forcibly shut off when an incident is detected by the incident detecting means.

23. A suspension system as claimed in claim 22, wherein the power source is so disposed as to be constantly supplied to the discharge control valve from a battery power source.

24. A suspension system as claimed in claim 23, wherein:

the supply-discharge control means comprises a first control section and a second control section, the first control section being for implementing control to open or close the supply control valve and the discharge control valve, and the second control section being for implementing control to open or close the discharge control valve;

the power source is constantly supplied to the second control section from the battery power source; and the second control section is so disposed as to open the discharge control valve when an incident is decided as the first incident mode by the decision means due to occurrence of the incident in the first control section.

25. A suspension system for an automotive vehicle, comprising;

a cylinder unit interposed between a sprung weight and a support for each wheel;

a pump for converting a low pressure operating fluid within a reservoir tank into a high pressure operating fluid;

a high pressure line for supplying the high pressure operating fluid to each of the cylinder units by the pump;

a low pressure line for returning the operating fluid within each of the cylinder units to the reservoir tank;

a supply control valve connected to the high pressure line, which is of an electromagnetic type capable of separately and independently supplying the operating fluid to each of the cylinder units;

a discharge control valve connected to the low pressure line, which is of an electromagnetic type capable of separately and independently discharging the operating fluid from each of the cylinder units;

supply-discharge control means for controlling opening and closing of the supply control valve and the discharge control valve under a predetermined condition;

incident detecting means for detecting occurrence of an incident which impedes normal implementation of control by the supply-discharge control means;

decision means for deciding if the incident detected by the incident detecting means is in a first incident mode or in a second incident mode, the first incident mode being to suspend control by the supply-discharge control means in a state in which a vehicle height of an automotive vehicle body is lowered by discharging the operating fluid within the cylinder unit, and the second incident mode being to suspend the control by the supply-discharge control means by maintaining a current vehicle height thereof;

execution means for executing the incident mode decided by the decision means;

differential pressure detecting means for detecting a difference in inner pressure between a left-hand cylinder unit and a right-hand cylinder unit;

correction means for forcing the execution means to execute the first incident mode based on a decision by the decision means, when the difference in inner pressure is equal to or greater than a predetermined value detected by the differential pressure detecting means; and a fail valve for forcilby releasing the high pressure line to the reservoir tank when the incident is detected by the incident detecting means.

26. A suspension system as claimed in claim 25, further comprising a valve unit for preventing the inner pressure within the cylinder unit from lowering below a predetermined value by regulating the discharge of the operating fluid from the cylinder unit.

27. A suspension system as claimed in claimed 25, wherein a gas spring is separately and independently connected to each of the cylinder units.

28. A suspension system as claimed in claim 27, wherein an orifice is interposed between each of the cylinder units and the respective gas spring.

29. A suspension system as claimed in claim 25, wherein the differential pressure detecting means comprises pressure detecting means for detecting an inner pressure within each of the cylinder units separately and independently from each other, which is so arranged as to generate output to the correction means when the difference between the inner pressures detected by the pressure detecting means for the left-hand cylinder unit and the right-hand cylinder unit on the front side is equal to or greater than a predetermined value or when the difference between the inner pressure detected by the pressure detecting means for the left-hand cylinder unit and the right-hand cylinder unit on the rear side is equal to or greater than a predetermined value.

30. A suspension system as claimed in claim 26, wherein a valve unit for retaining the inner pressure is closed when pressure within the high pressure line works as a pilot pressure and when the pressure within the high pressure line is equal to or smaller than a predetermined value.

31. A suspension system as claimed in claim 1, wherein the correcting means corrects the control by the second control means so as to suppress a roll of the automotive vehicle body.

* * * * *